W. F. DRAPER & J. B. BANCROFT.
Guides for Yarn-Spooling Machines.

No. 148,287. Patented March 10, 1874.

Witnesses
S. W. Piper
L. N. Höller

William F. Draper.
Joseph B. Bancroft.
by their attorney
N. W. Eddy

UNITED STATES PATENT OFFICE.

WILLIAM F. DRAPER AND JOSEPH B. BANCROFT, OF HOPEDALE, MASS.

IMPROVEMENT IN GUIDES FOR YARN-SPOOLING MACHINES.

Specification forming part of Letters Patent No. 148,287, dated March 10, 1874; application filed February 4, 1874.

*To all whom it may concern:*

Be it known that we, WILLIAM F. DRAPER and JOSEPH B. BANCROFT, of Hopedale, of the county of Worcester and State of Massachusetts, have invented a new and useful Improvement in Guides for Machines for Spooling Yarn; and do hereby declare the same to be fully described in the following specification, and represented in the accompanying drawings, of which—

Figure 1:
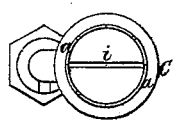
Figure 2:
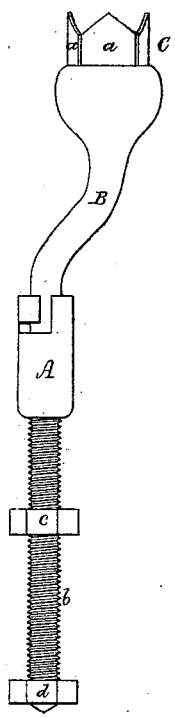
Figure 3:
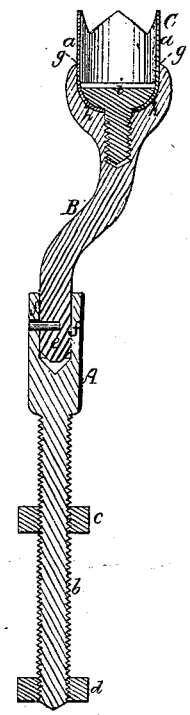

Figure 1 is a top view, Fig. 2 a side elevation, and Fig. 3 a longitudinal section, of one of our improved yarn-guides for spoolers.

This guide readily adapts or adjusts itself to the line of draft of the yarn between the bobbin and the spool, as such line may continue to diverge or increase in obliquity as the mass of yarn wound on the spool may increase in diameter; furthermore, the guide-slit plates are arranged in a circle and held in a socket in the adjustable arm by a clamp-screw, such arrangement admitting of a series of guide-slits instead of a single one being extended from or applied to the arm, thus enabling a fresh slit to be used, or the slits to be varied in width as wear of the slit or slits may take place.

Figure 4:
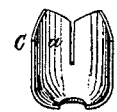

In the drawings, A denotes the stand or supporter of the adjustable arm B, carrying the guide C or series of guide-pieces $a\ a\ a\ a$, one of which is shown in perspective view in Fig. 4. The said supporter has a screw, $b$, and nuts $c\ d$, for holding it in place in the machine, and it is socketed at the top, as shown at $f$, to receive the pivot $e$ of the bent arm B.

Such pivot may be held in place by a "bayonet connection" or other suitable substitute. At its head or upper part the arm is provided with a cylindrical socket, $g$, having a conical or tapering bottom, $h$. A screw, $i$, having a head countershaped as shown, relatively to the socket, serves, when screwed down upon the several guide-pieces $a\ a\ a\ a$, to hold them in place in the socket. Each guide-piece, besides being curved transversely to fit to the periphery of the socket, is flanged or bent to rest upon the bottom of the socket, the same being as represented, and enabling the screw-head, by bearing upon the flange, to hold the guide-piece in place. The guide-pieces can be adjusted in distance asunder, and fixed in position, as occasion may require. As the arm can turn freely in its socket, the guide can readily move around to accommodate itself to the line of draft of the yarn, as such line may change its obliquity as the mass of yarn wound on the spool may increase in diameter.

We claim as our invention as follows, viz:

1. The combination of the arm B, pivoted to the supporter A, with such supporter and the guide C.

2. The guide C, composed of the series of flanged plates $a$, in combination with the arm B, socketed and provided with the clamp-screw, all being substantially as specified.

WM. F. DRAPER.
    JOSEPH B. BANCROFT.

Witnesses:
 JOHN S. MEAD,
 JAMES R. DAVIS.